United States Patent [19]
Ghosh

[11] Patent Number: 5,802,117
[45] Date of Patent: Sep. 1, 1998

[54] METHOD AND APPARATUS FOR JOINT FREQUENCY OFFSET AND TIMING ESTIMATION OF A MULTICARRIER MODULATION SYSTEM

[75] Inventor: Monisha Ghosh, Mohegan Lake, N.Y.

[73] Assignee: Philips Electronics North America Corporation, New York, N.Y.

[21] Appl. No.: 605,318

[22] Filed: Feb. 8, 1996

[51] Int. Cl.$^6$ .................................................. H04L 27/06
[52] U.S. Cl. ............................................................ 375/344
[58] Field of Search .............................. 375/344, 260, 375/267, 347, 349, 376, 355; 455/313, 314, 315, 337; 340/825.01

[56] References Cited

U.S. PATENT DOCUMENTS

| | | | |
|---|---|---|---|
| 5,029,184 | 7/1991 | Andren et al. | 375/267 |
| 5,225,062 | 7/1993 | Bingman | 375/97 |
| 5,228,062 | 7/1993 | Bingham | 375/344 |
| 5,608,784 | 3/1997 | Sugita et al. | 375/344 |

FOREIGN PATENT DOCUMENTS 0706273  4/1996  European Pat. Off. .

OTHER PUBLICATIONS

"MCM Design for Transmission of Digitally–Compressed Television Signals in a Simulcast Terrestrial Channel" by Samir N. Hulyalkar, Philips Laboratories Document No. TN 92–012.

"Principles of Modulation and Channel Coding for Digital Broadcasting for Mobile Receivers" by Michel Alard and Roselyne Lassalle EBU Review-Trechnical, pp. 168–190.

Lessons in Digitial Estimation Theory, by Jerry M. Mendel, Prentice–Hall, Inc. Englewood Cliffs, NJ, pp. 46–47.

Paul H. Moose, "A Technique for Orthogonal Frequency Division Multiplexing Frequency Offset Correction," IEEE Transactions on Communications, vol. 42, No. 10, pp. 2908–2914, (Oct. 1994).

John A.C. Bingham, "Multicarrier Modulation for Data Transmission: An Idea Whose Time Has Come," IEEE Communications Magazine, pp. 5–8, 11–14, (May 1990).

*Primary Examiner*—Stephen Chin
*Assistant Examiner*—Kevin Kim
*Attorney, Agent, or Firm*—Michael E. Marion

[57] ABSTRACT

A transmitter-receiver system and a method for transmitting and receiving MCM signals, whereby any frequency offset and timing mismatch can be determined and corrected simultaneously, prior to demodulating the received signal. A plurality of single tone signals are transmitted prior to the transmission of the symbols corresponding to the desired information. The receiver is outfitted with a Frequency Offset and Timing Estimator for receiving theme plurality of single tone signals, estimating any frequency offset and timing mismatch and correcting the sampler and sampled signal accordingly, prior to demodulating the sampled signal.

18 Claims, 2 Drawing Sheets

METHOD AND APPARATUS FOR JOINT FREQUENCY OFFSET AND TIMING ESTIMATION OF A MULTICARRIER MODULATION SYSTEM

FIELD OF THE INVENTION

This invention relates generally to transmitting and receiving multicarrier modulated signals. In particular, the invention provides a system and method for estimating and correcting any frequency offset and timing mismatch at the receiver, prior to demodulating the received signal.

BACKGROUND OF THE INVENTION

In many signal transmission applications, such as television, radio, and telephony, digital signal schemes are becoming the preferred choice over the traditional analog schemes. For example, Digital Audio Broadcast ("DAB") is a digital system used in Europe for the transmission and reception of radio signals. One digital signal scheme with which the present invention is concerned, involves the transmission of information over multiple frequencies, referred to as multicarrier transmission schemes. These multiple frequencies are combined into a single signal for transmission in a process referred to as modulation, and are separated at the receiver for retrieving the information carried by the individual frequencies, in a process referred to as demodulation. The combination of these processes are known as Multicarrier Modulation ("MCM").

In MCM schemes, also known in the literature as Orthogonal Frequency Division Multiplexing (OFDM), a stream of symbols to be transmitted is divided into blocks of data symbols. Each block of data symbols is transformed into another block of symbols by taking the inverse Fast Fourier Transform ("IFFT"). It is this new block of symbols that is actually transmitted. MCM has been studied in the context of telephone modems and most recently as an efficient modulation scheme for DAB. A more detailed description of the general principles of MCM can be found in John A. C. Bingham, *Multicarrier Modulation for Data Transmission: An Idea Whose Time Has Come*, IEEE Communications Magazine, pp. 5–14 (May 1990), hereby incorporated by reference, as if fully set forth herein.

Two important criteria for effective use of multicarrier digital signal systems is the ability to accurately identify the individual carrier frequencies, and to do so as quickly as possible. A delay in identifying the correct frequency will degrade the performance of the system. For example, when changing the channel on a radio or television set which are designed to receive multicarrier digital signals, which has a long delay in identifying the individual carrier frequencies, one would like the picture and sound to appear as soon as possible. However, one determining factor in how long it takes to receive a picture or sound on a newly tuned channel is the delay involved in the receiver in identifying the individual carrier frequencies. The present invention relates to a method and an apparatus fo implementing the method, for quick and accurate identification of the individual carrier frequencies.

To better understand the invention, the following additional background information on MCM schemes is helpful. A MCM transmitted symbol can be represented by the equation $$s(t) = \sum_{k=0}^{N-1} a_k e^{j2\pi kt/NT} \qquad (1)$$

where $a_k$ is the complex information symbol sequence, T is the information symbol interval, N is the number of orthogonal carriers used in the scheme, each of which is to be sampled over T seconds, and NT is the MCM symbol interval. The parameters N and T are chosen to satisfy specific bit rate requirements of a particular application. For example, in S. N. Hulyalkar, *MCM Design for Transmission of Digitally-Compressed Television Signals in a Simulcast Terrestrial Channel* PLB Technical Note TN-92-012, hereby incorporated by reference as if fully set forth herein, a MCM scheme for the transmission of digitally compressed television over a terrestrial channel is considered where N=1024 and NT=127.19 microseconds.

In the absence of channel distortions, noise, frequency offset and timing errors, the transmitted information sequence can be recovered perfectly at the receiver by sampling the received signal every T seconds and after receiving N samples performing an N-point FFT on the received sequence. The FFT at the receiver performs like a matched filter at each of the N carrier frequencies. In order to reliably demodulate the received signal and recover the transmitted information sequence, the orthogonality of the transmitted carriers has to be maintained at the receiver. In real systems, however, intersymbol interference ("ISI"), receiver frequency offset and timing errors all contribute to destroying the orthogonality of the transmitted carriers and can result in severe performance degradations if left uncompensated.

A well-known technique for dealing with intersymbol interference is the insertion of a "guard interval" at the beginning of each transmitted symbol. See A. Alard and R. Lassalle, *Principles of Modulation and Channel Coding for Digital Broadcasting for Mobile Receivers* EBU Review, No. 224 (August 1987), hereby incorporated by reference as if fully set forth herein. In multi-path systems, such as television signals, a receiver may detect a direct signal and one or more delayed reflections of the same signal, such as off a skyscraper, as the sum of these multiple signals. The guard interval enables the receiver to resolve these signals in order to accurately detect the direct signal alone.

Frequency offset and time synchronization are also critical to accurately retrieve the transmitted data. Frequency offset occurs when a carrier frequency undergoes a phase shift during transmission and the receiver frequency is not perfectly aligned with the transmission frequency. This phase shift causes the carriers to lose their orthogonal characteristic. Because the carriers are inherently closely spaced in frequency compared to the channel bandwidth, there is a very low tolerance for even a small frequency offset relative to the channel bandwidth. To properly retrieve the transmitted data from the carrier, the receiver must be able to compensate for this frequency offset.

When correcting for frequency offset, it is also advantageous to determine and correct any frequency offset prior to the FFT operation of the receiver. This allows the receiver to quickly converge onto the accurate frequency of the carriers and process the received signals. If, however, the FFT operation is performed before any frequency offset is corrected, the process of determining and correcting any frequency offset is delayed.

To properly synchronize a receiver and an incoming signal, a receiver must know the bit transfer rate, so that as a signal is received, the receiver samples the incoming signal at the appropriate sample interval T. However, timing involves more than the sample interval T. The receiver must also know the sample marking the beginning of each symbol interval NT. If the sampler is not properly aligned with the symbol interval, the sampling window will overlap and process the symbols detected over multiple symbol intervals as if they were all part of one symbol interval, rather than process the symbols of one symbol interval, alone. Determining the beginning of each symbol interval is referred to as symbol synchronization. Symbol synchronization and accurate knowledge of sample interval T are collectively known as time synchronization. The importance of frequency offset and time synchronization notwithstanding, very little has appeared in the literature regarding frequency and time synchronization issues for MCM systems.

One method for frequency offset estimation is described in P. H. Moose, *A Technique for Orthogonal Frequency Division Multiplexing Frequency Offset Correction* IEEE Transactions on Communications Vol. 42 No. 10 (October 1994), hereby incorporated by reference, as if fully set forth herein. Moose, however, relies on perfect timing information, in other words, the receiver knows T exactly, which in practice, i.e., useful, real-world situations, is not available to the receiver.

Neglecting to compensate for a timing mismatch can have a serious impact on the receiver's ability to detect an incoming signal. Consider a received MCM signal over one symbol interval. Taking into account the guard interval, a frequency offset and additive white Gaussian noise ("AWGN"), the received signal can be represented as:

$$r(t) = \sum_{k=0}^{N-1} H_k a_k e^{j2\pi k t/NT_0} e^{j2\pi \epsilon t/NT} + w(t) \tag{2}$$

where $H_k$ represents the frequency response of the channel at the $k^{th}$ carrier, $\epsilon$ is the frequency offset and $w(t)$ is complex AWGN. This signal is sampled by the receiver at intervals of T+ΔT and an initial offset τ. The clock error ΔT is assumed to be small enough so that N samples are obtained during the symbol interval. Sampling r(t) at [n(T+ΔT)+τ], each sample along symbol interval NT can be expressed as $$r(n) = \sum_{k=0}^{N-1} H_k a_k e^{j2\pi(k+\epsilon)(nT+n\Delta T+\tau)/NT} + w_n \tag{3}$$

Assuming symbol synchronization is available so that the receiver knows which sample marks the beginning of each symbol interval, the FFT of $r_n$ can be written as:

$$R = \frac{1}{N} \sum_{k=0}^{N-1} r_n e^{-j2\pi nk/N} = \tag{4}$$

$$\frac{1}{N} \sum_{k=0}^{N-1} H_k a_k \frac{\sin\pi\left[(k+\epsilon)\left(1+\frac{\Delta T}{T}\right)-n\right]}{\sin\frac{\pi}{N}\left[(k+\epsilon)\left(1+\frac{\Delta T}{T}\right)-n\right]} e^{j\frac{\pi}{N}[(k+\epsilon)(1+\frac{\Delta T}{T})-n](N-1)} + W_n \tag{5}$$

One skilled in the art will recognize that each sample $R_n$ comprises a direct signal component $S_n$, an interference component $I_n$ and an AWGN component $W_n$. The signal component can be expressed as $$S_n = \frac{1}{N} \left[ H_n a_n \frac{\sin\pi\left(n\frac{\Delta T}{T}+\epsilon+\epsilon\frac{\Delta T}{T}\right)}{\sin\frac{\pi}{N}\left(n\frac{\Delta T}{T}+\epsilon+\epsilon\frac{\Delta T}{T}\right)} e^{j\frac{\pi}{N}[n\frac{\Delta T}{T}+\epsilon+\epsilon\frac{\Delta T}{T}](N-1)} \right] \tag{6}$$

while the interference component can be expressed as $$I_n = \frac{1}{N} \sum_{\substack{k=0 \\ k\neq n}}^{N-1} H_k a_k \frac{\sin\pi\left[(k+\epsilon)\left(1+\frac{\Delta T}{T}\right)-n\right]}{\sin\frac{\pi}{N}\left[(k+\epsilon)\left(1+\frac{\Delta T}{T}\right)-n\right]} e^{j\frac{\pi}{N}[(k+\epsilon)(1+\frac{\Delta T}{T})-n](N-1)} \tag{7}$$

To one skilled in the art, it is apparent from equation (7) that the interference due to frequency offset $\epsilon$ and sampling interval mismatch ΔT, appears as a time-varying convolution involving all the k carriers. In other words, the orthogonality of the carriers has been destroyed. Assuming an independent, identically distributed data stream $a_k$ and a flat channel, i.e., no ISI, the signal-to-interference-ratio, ("SIR") can be written as $$SIR(n) = \frac{\frac{\sin^2\pi\left(n\frac{\Delta T}{T}+\epsilon+\epsilon\frac{\Delta T}{T}\right)}{\sin^2\frac{\pi}{N}\left(n\frac{\Delta T}{T}+\epsilon+\epsilon\frac{\Delta T}{T}\right)}}{\sum_{\substack{k=0 \\ k\neq n}}^{N-1} \frac{\sin^2\pi\left(k\frac{\Delta T}{T}+\epsilon+\epsilon\frac{\Delta T}{T}\right)}{\sin^2\frac{\pi}{N}\left(k-n+k\frac{\Delta T}{T}+\epsilon+\epsilon\frac{\Delta T}{T}\right)}} \tag{8}$$

When the frequency offset $\epsilon$ is zero, the SIR(n) is a function of n due to the fact that the convolution is time variable, and the SIR can be approximated to $$SIR(n) \approx \frac{1}{4}\left[1+\frac{1}{n\frac{\Delta T}{T}}\right]^2 \tag{9}$$

Thus, it is clear that even a small timing error, for example, an error on the order of $10^{-4}$, can reduce the SIR drastically. If instead ΔT is assumed to be zero when in fact it is not, and it is not corrected, the receiver will perform poorly. Moreover, this effect, unlike the effect of frequency offset $\epsilon$, is not uniform over all carriers. This can be seen from equation 9 where it is apparent that if there is a timing mismatch, the SIR is a function of n. Thus, it is important for the receiver to employ accurate timing recovery schemes to estimate ΔT/T and thereby improve the SIR.

SUMMARY OF THE INVENTION

Accordingly, it is an object of the present invention to provide a transmitter-receiver system for transmitting and receiving MCM signals, whereby any frequency offset and timing mismatch can be determined and corrected simultaneously, prior to demodulating the received signal. In furtherance of this objective, a system, method and data structure are provided in which prior to the transmission of data, a plurality of single tone signals are first transmitted. The receiver is outfitted with a Frequency Offset and Timing Estimator for receiving the plurality of single tone signals, estimating any frequency offset and timing mismatch and correcting the sampler and sampled signal accordingly, prior to demodulating the sampled signal.

A method is also provided for determining and correcting any frequency offset and timing mismatch simultaneously, and prior to demodulating a received signal. The method includes transmitting data with a preamble comprising a plurality of single tone signals which are used by the receiver to estimate any frequency offset and timing mismatch. The estimated timing mismatch is input to a timing control device for correcting the sampler component of the receiver and the estimated frequency offset is input to a frequency control device for corrected the sampled symbols. The mismatches are both corrected prior to demodulating the received signal.

DETAILED DESCRIPTION OF THE INVENTION

Figure 1:
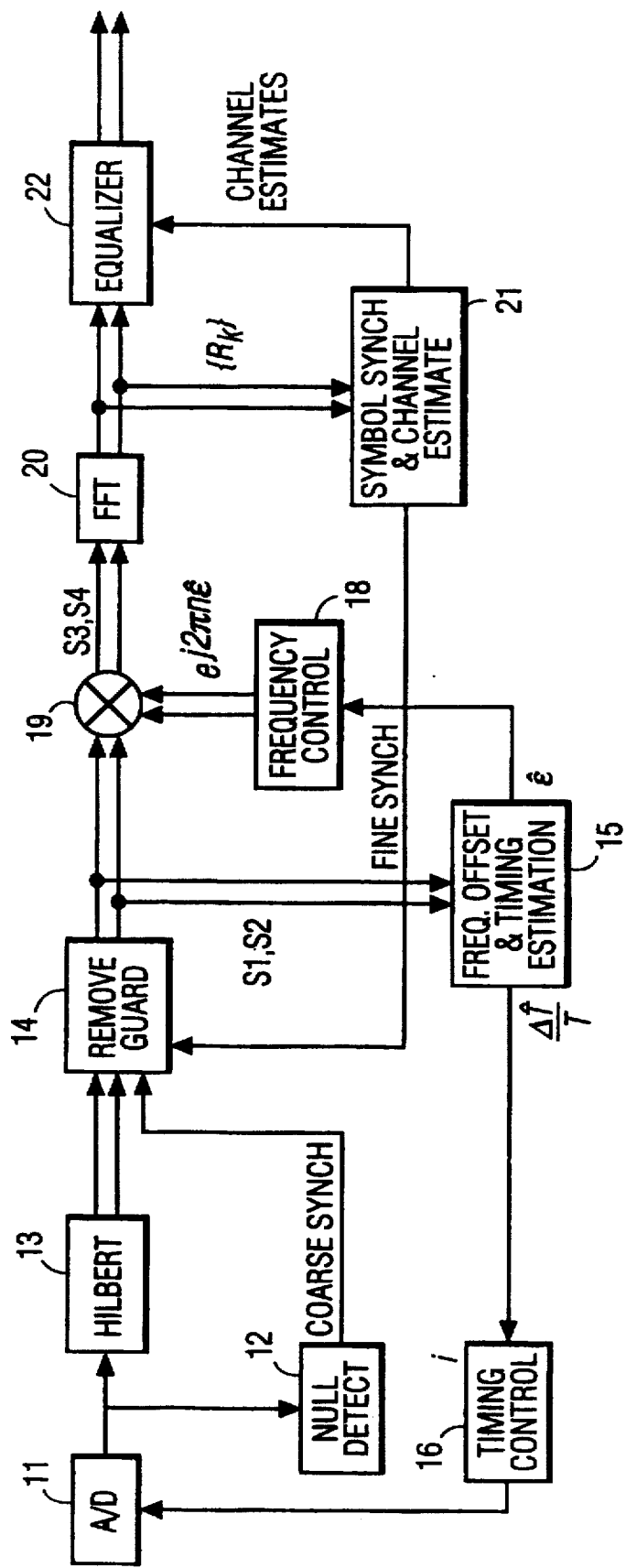
FIG. 1 is a block diagram of a MCM receiver showing frequency offset compensation and timing estimation according to the present invention.
Figure 2:
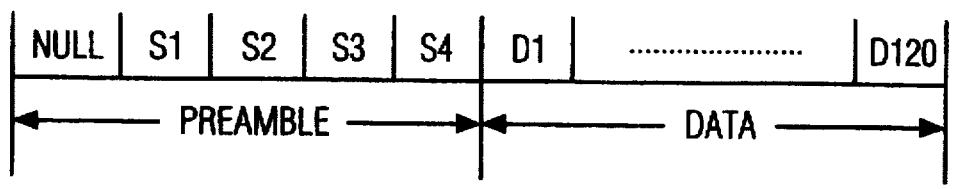
FIG. 2 depicts a data structure as used in connection with the transmitter-receiver system of the present invention.

Referring to FIG. 1, a block diagram of a MCM receiver is shown. As a signal is received, Analog Digital Converter (11) samples the incoming analog signal at intervals of T seconds. After digitizing the received analog signal, Null Detect block (12) detects the null symbol as shown in FIG. 2. The digitized signal also enters block (13) in which a Hilbert transform filter converts the received real signal to a complex form. The signal then enters block (14) which uses the output of Null Detect (12) as a rough indicator of the first symbol of each block of data. Remove Guard block (14) removes the guard interval preceding each symbol. As the signal exits block (14), single tone symbols S1 and S2 are input to Frequency Offset and Timing Estimator block (15). In block (15) the frequency offset and timing mismatch of the sampler are calculated simultaneously, prior to the FFT operation of the receiver. The timing synchronization information $\Delta T/T$, is input to Timing Control block (16) and the frequency offset $\epsilon$ is input to Frequency Control block (18). These control blocks can be implemented with standard components, such as a phase-locked loop.

In multiplier (19), the received signal is adjusted to compensate for any frequency offset based on the estimate received from block (15). At this point, Analog-Digital Converter (11) has been corrected for $\Delta T/T$ and any frequency offset of the sampled signal, has been compensated. The receiver now takes the FFT of the synchronized and compensated signal in block (20). Symbol Synchronizer and Channel Estimator (21) tap symbols S3 and S4 from the output of FFT block (20) and determine the start of each symbol interval and also estimate the frequency response of each carrier, i.e., $H_k$. The symbol synchronization is input to Remove Guard block (14) to be used together with the information from Null Detect block (12) to determine the start of the first symbol of the next symbol interval. The estimated frequency response $H_k$ is input to Equalizer (22) which determines the maximum likelihood representation of each data symbol at their respective carrier frequencies.

The transmitter receiver system of the present invention, in which frequency offset compensation and timing synchronization occurs simultaneously and prior to the FFT operation of a receiver, involves a specific data structure which includes at least two (2) single tone symbols which precede the symbols corresponding to the information sought to be transmitted. Referring to FIG. 2, one preferred data structure as used in the present invention, is shown comprising a preamble, composed of five symbols, followed by a sequence of data symbols, i.e. the information sought to be transmitted. The first symbol is a null symbol, used to obtain a coarse estimate of the start of each symbol interval. A simple energy detector detects a sudden increase in energy from the null symbol to S1 thereby roughly indicating the first symbol of each block of data.

Following the null symbol are single tone symbols S1 and S2 with different frequencies, transmitted over consecutive data intervals of length NT, and separated by a guard interval of length $N_g T$. The frequencies of S1 and S2 can be expressed as $M_1/NT$ and $M_2/NT$, respectively. As shown below, $M_1$ and $M_2$ should have relatively small values, whose difference is large. S1 and S2 are then followed by symbols S3 and S4 which contain all the carrier frequencies of the data symbols and are used for symbol synchronization. Finally, S3 and S4 are followed by the symbols corresponding to the desired information.

By concatenating single tone symbols to the front end of the transmitted data, the frequency offset and timing mismatch can be determined prior to performing an FFT over the received symbols, since these symbols do not require any demodulation. The mechanics of estimating the frequency offset and timing mismatch using S1 and S2, proceeds as follows: The expression for the received samples over a symbol interval, as shown in equation (3), can be rewritten as $$r(n) = \sum_{k=0}^{N-1} H'_k a_k e^{j2\pi n(k+\epsilon)(1+\Delta T/T)/N} + w_n \qquad (10)$$

where $$H'_k H_k e^{j2\pi n(k+\epsilon)/NT} \qquad (11)$$

For S1 and S2, the received sample sequence over their respective symbol intervals, can be expressed as $$r_n = H'_{M_1} a_{M_1} e^{j\frac{2\pi n}{N}(M_1+\epsilon)(1+\frac{\Delta T}{T})} + w_n \qquad (12)$$

and $$r_n = H'_{M_2} a_{M_2} e^{j\frac{2\pi n}{N}(M_2+\epsilon)(1+\frac{\Delta T}{T})} + w_n \qquad (13)$$

respectively.

Figure 3:
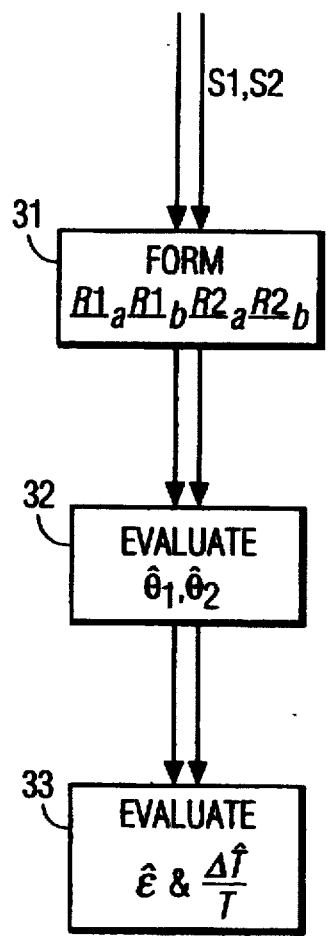
FIG. 3 is a block diagram of the frequency offset compensation and timing estimation process according to the present invention.

These sequences are input to Frequency Offset and Timing Estimator block (15). As shown in FIG. 3, Estimator (15) begins in block (31) by dividing the samples of each symbol interval, in half, and forms the following sample vectors from the samples of S1 and S2.

$$\underline{R1_a} = [r_0, \ldots, r_{\frac{N}{2}-1}] \qquad (14)$$

$$\underline{R1_b} = [r_{\frac{N}{2}}, \ldots, r_{N-1}] \qquad (15)$$

-continued $$\underline{R2_a} = [r_{N+N_g}, \ldots, r_{\frac{3N}{2}+N_g-1}] \quad (16)$$

$$\underline{R2_b} = [r_{\frac{3N}{2}+N_g}, \ldots, r_{2N+N_g}] \quad (17)$$

Note that although S1 and S2 are consecutive symbols, each of length NT, due to the guard interval of length $N_gT$ between these two symbols, S2 is first sampled at time $(N+N_g)T$.

For purposes of estimating any frequency offset and timing mismatch, it is not necessary to have precise symbol synchronization. Indeed, since S3 and S4, the symbols used for precise symbol synchronization are modulated over multiple carriers, precise symbol synchronization is only available after demodulating S3 and S4, whereas an objective of the present invention is to estimate and correct any frequency offset and timing mismatch prior to demodulation. Rather, coarse symbol synchronization is sufficient if the length of each vector is reduced from N/2 to a value which will ensure that vectors $R1_a$ and $R1_b$ have samples from the sample interval corresponding to S1 and vectors $R1_a$ and $R1_b$ have samples from the sample interval corresponding to S2. Although the actual vector length used will affect the variance of the estimates, it will not affect the nature of the estimator, namely, that it is a maximum-likelihood estimation.

From equations (12) and (13), the relationship between the vectors for each symbol can be shown as $$\underline{R1_b} = \underline{R1_a} e^{j\pi(\epsilon+M_1\frac{\Delta T}{T}+\epsilon\frac{\Delta T}{T})} \quad (18)$$

$$\underline{R2_b} = \underline{R2_a} e^{j\pi(\epsilon+M_2\frac{\Delta T}{T}+\epsilon\frac{\Delta T}{T})} \quad (19)$$

Assuming $M_1$ and $M_2$ are even, the terms $e^{j\pi M_1}$ and $e^{j\pi M_2}$ equal 1 and the vector relationships can be rewritten as $$\underline{R1_b} = \underline{R1_a} e^{j\pi(\epsilon+M_1\frac{\Delta T}{T}+\epsilon\frac{\Delta T}{T})} \quad (20)$$

$$\underline{R2_b} = \underline{R2_a} e^{j\pi(\epsilon+M_2\frac{\Delta T}{T}+\epsilon\frac{\Delta T}{T})} \quad (21)$$

Now, let $$\theta_1 = \pi\left(\epsilon + M_1\frac{\Delta T}{T} + \epsilon\frac{\Delta T}{T}\right) \quad (22)$$

$$\theta_2 = \pi\left(\epsilon + M_2\frac{\Delta T}{T} + \epsilon\frac{\Delta T}{T}\right) \quad (23)$$

Accordingly, Estimator (15) computes the maximum likelihood estimate of $\theta_1$ and $\theta_2$, as shown in block (32) and given by $$\hat{\theta}_1 = \tan^{-1}\frac{(R1_b^T R1^*_a)_{Im}}{(R1_b^T R1^*_a)_{Re}} \quad (24)$$

$$\hat{\theta}_2 = \tan^{-1}\frac{(R2_b^T R2^*_a)_{Im}}{(R2_b^T R2^*_a)_{Re}} \quad (25)$$

Since the maximum likelihood estimate is a consistent estimate, which means that the estimate of a function, for example, the estimates of $\theta_1$ and $\theta_2$, can be used to estimate a function, such as frequency offset $\epsilon$ and timing mismatch $\frac{\Delta T}{T}$, of the estimated $\theta_1$ and $\theta_2$, $\epsilon$ and $\frac{\Delta T}{T}$ can be estimated from the estimates of $\theta_1$ and $\theta_2$. The maximum likelihood estimates of $\epsilon$ and $\Delta T/T$ are computed in block (33) as, $$\hat{\epsilon} = \frac{\hat{\theta}_1 M_2 - \hat{\theta}_2 M_1}{\pi(M_2-M_1)+(\hat{\theta}_2-\hat{\theta}_1)} \text{; and} \quad (26)$$

$$\frac{\hat{\Delta T}}{T} = \frac{\hat{\theta}_2 - \hat{\theta}_1}{\pi(M_2-M_1)} \quad (26)$$

respectively. The range of $\epsilon$ that can be estimated by this procedure can be increased by shortening the length of each of the vectors used in the estimation procedure. For small $\Delta T/T$ and a vector length of N/2, the range over which E can be estimated unambiguously is $|\epsilon|<1$. The mathematical operations involved in arriving at these estimates can be implemented with specific physical components, such as multipliers, adders, and a readable memory for storage of a lookup table, or they can be implemented through a general purpose or dedicated microprocessor executing software instructions.

As indicated above the frequency offset and timing mismatch estimates are obtained prior to exact symbol synchronization and FFT operations and hence do not delay the estimation process. Furthermore, since these are maximum likelihood estimates, they are very efficient, even at low signal to noise ratios ("SNR").

Since the frequency, offset and clock error are estimated jointly, a joint Cramer-Rao lower bound ("CRLB") on the variances of the frequency offset and timing mismatch estimates is given by $$Var(\hat{\epsilon}) \geq \frac{4\sigma^2}{\pi^2 N}\left[\frac{(M_1+\epsilon)^2|H_{M_1}a_{M_1}|^2+(M_2+\epsilon)^2|H_{M_2}a_{M_2}|^2}{(1+\Delta T/T)^2|H_{M_1}a_{M_1}|^2|H_{M_2}a_{M_2}|^2(M_1-M_2)^2}\right] \quad (27)$$

$$Var\left(\frac{\hat{\Delta T}}{T}\right) \geq \frac{4\sigma^2}{\pi^2 N}\left[\frac{|H_{M_1}a_{M_1}|^2+|H_{M_2}a_{M_2}|^2}{|H_{M_1}a_{M_1}|^2|H_{M_2}a_{M_2}|^2(M_1-M_2)^2}\right] \quad (28)$$

The Cramer-Rao lower bound is a measure of the variance of the best estimator for any problem. Indeed, these expressions can be used as exact variances instead of lower bounds, since the maximum likelihood estimate satisfies the Cramer-Rao lower bound. A more detailed description of the Cramer-Rao lower bound can be found in J. M. Mendel, *Lessons in Digital Estimation Theory*, (1987), hereby incorporated by reference as if fully set forth herein.

As indicted above, selecting $M_1$ and $M_2$ is an important design issue. Equations (26) and (27) show that lower variance of frequency offset $\epsilon$ and timing mismatch $\Delta T/T$ is obtained by using values of $M_1$ and $M_2$ which are widely spaced. In addition, $M_1$ and $M_2$, should each be relatively small. One skilled in the art will be able to readily experiment with and ascertain highly efficient values of $M_1$ and $M_2$, in order to minimize the variance of the estimates. Other factors, such as distortion due to frequency band edges and known interferers at certain frequencies will also influence the optimum choice of $M_1$ and $M_2$. For example, the MCM scheme being considered for the transmission of digitally compressed television over a terrestrial channel, where N=1024 and NT=127.19 μsec, the best $M_1$ and $M_2$ were shown by simulations to be 100 and 400, respectively. In general, the best $M_1$ and $M_2$ will be determined on a case-by-case basis by simulation, actual experimentation, or both.

The foregoing merely illustrates the principles of the present invention. Those skilled in the art will be able to devise various modifications, which although not explicitly described or shown herein, embody the principles of the invention and are thus within its spirit and scope.

What is claimed is:

1. A transmitter-receiver system for transmitting and receiving multicarrier modulated digital signals, comprising:

a transmitter for transmitting data as a multicarrier modulated signal, said transmitter including means for transmitting at least a first single tone signal and a second single tone signal to precede said multicarrier modulated data signal, said multicarrier modulated data signal and said preceding single tone signals comprising a data structure; and a receiver for receiving said data structure, and compensating for a frequency offset and a timing mismatch prior to demodulating said multicarrier modulated signal, said receiver comprising:

a sampler for symbol detection of said multicarrier modulated signal and appended single tone signals wherein said sampler detects N samples of each of said distinct tone signals over a symbol interval, each of said single tone signals having a frequency equal to an even multiple of the inverse of said symbol interval;

a frequency offset and timing estimator for retrieving said distinct single tone signals prior to demodulating said multicarrier modulated signal, and estimating said frequency offset and said timing mismatch of said sampler, and wherein said frequency offset and timing estimator further comprises:

means for dividing each of said distinct tone signals into a first and second sample vector, for a total of four sample vectors, each of said first sample vectors comprising a first part of said samples of said single tone signal, respectively, and each of said second sample vectors comprising a second part of said samples of said single tone signal, respectively;

means for computing a first inverse tangent of the ratio of an imaginary part to a real part of the product of the transform of said second sample vector of said first single tone signal and said first sample vector of said first single tone signal, and means for computing a second inverse tangent of the ratio of an imaginary part to a real part of the product of the transform of said second sample vector of said second tone signal and said first sample vector of said second single tone signal;

means for computing said estimated frequency offset as the ratio of the difference between the product of said first inverse tangent and said second multiple and the product of said second inverse tangent to said multiple, to the sum of the product of n and the difference between said first and second inverse tangents; and means for computing said estimated timing mismatch as the ratio of the difference between said first and second inverse tangents, to the product of n and the difference between said first and second multiples;

a timing control mechanism for receiving said estimated timing mismatch and adjusting said sampler accordingly; and a frequency control mechanism for receiving said estimated frequency offset and adjusting said detected multicarrier modulated signal accordingly.

2. A transmitter-receiver system according to claim 1, wherein said data structure comprises a null symbol, said two distinct single tone signals, and said multicarrier modulated data signals.

3. A transmitter-receiver system according to claim 1, wherein said data structure comprises a null symbol, said two distinct single tone signals, one or more multicarrier modulated signals for use in symbol synchronization of said receiver, and said multicarrier modulated data signals.

4. A transmitter receiver system according to claim 1, wherein said demodulating includes a Fourier transform operation.

5. A transmitter-receiver system according to claim 4 wherein said means for estimating a frequency offset and a timing mismatch of said receiver and means for adjusting said receiver to compensate for said estimated frequency offset and timing mismatch enables said compensation prior to said receiver performing a Fourier transform on said multicarrier modulated signals.

6. A transmitter-receiver system according to claim 5 wherein said Fourier transform is a Fast Fourier transform.

7. A receiver for receiving a multicarrier modulated signal and compensating for a frequency offset and a timing mismatch prior to demodulating said multicarrier modulated signal, said multicarrier modulated signal having appended at least a first single tone signal and a second single tone signal, said receiver comprising:

a sampler for symbol detection of said multicarrier modulated signal and appended single tone signals wherein said sampler detects N samples of each of said distinct tone signals over a symbol interval, each of said single tone signals having a frequency equal to an even multiple of the inverse of said symbol interval;

a frequency offset and timing estimator for retrieving said distinct single tone signals prior to demodulating said multicarrier modulated signal, and estimating said frequency offset and said timing mismatch of said sampler, and wherein said frequency offset and timing estimator further comprises:

means for dividing each of said distinct single tone signals into a first and second sample vector, for a total of four sample vectors, each of said first sample vectors comprising a first part of said samples of said single tone signal, respectively, and each of said second sample vectors comprising a second part of said samples of said single tone signal, respectively;

means for computing a first inverse tangent of the ratio of an imaginary part to real part of the product of the transform of said second sample vector of said first single tone signal and said first sample vector of said first single tone signal, and means for computing a second inverse tangent of the ratio of an imaginary part to a real part of the product of the transform of said second sample vector of said second tone signal and said first sample vector of said second single tone signal;

means for computing said estimated frequency offset as the ratio of the difference between the product of said first inverse tangent and said second multiple and the product of said second inverse tangent to said multiple, to the sum of the product of n and the difference between said first and second multiples and the difference between said first and second inverse tangents; and means for computing said estimated timing mismatch as the ratio of the difference between said first and second inverse tangents, to the product of n and the difference between said first and second multiples;

a timing control mechanism for receiving said estimated timing mismatch and adjusting said sampler accordingly; and a frequency control mechanism for receiving said estimated frequency offset and adjusting said detected multicarrier modulated signal accordingly.

8. A receiver according to claim 7 wherein said demodulating involves a Fourier transform operation of said multicarrier modulated signal.

9. A receiver according to claim 7 wherein said first part of samples and said second part of samples, for each of said single tone signals comprise disjoint sets of samples.

10. A receiver according to claim 9 wherein said first and second parts of samples of said first single tone signal consists essentially of samples from said sample interval of said first single tone signal and said first and second parts of samples of said second single tone signal consists essentially of samples from said sample interval of said second single tone signal.

11. A receiver according to claim 10 wherein said first and second parts of samples for each of said single tone signals comprise an equal number of samples.

12. A receiver according to claim 11 wherein said first part of samples of each of said single tone signals consists of said samples received over a first half of said symbol interval and said second part of samples of each of said single tone signals consists of said samples received over a second half of said symbol interval.

13. A method for receiving a multicarrier modulated signal and compensating for a frequency offset and a timing mismatch prior to demodulating said multicarrier modulated signal, said multicarrier modulated signal having appended at least a first single tone signal and a second single tone signal, said method comprising:

sampling said multicarrier modulated signal and appended single tone signals wherein said sampling step detects N samples of each of said distinct single tone signals over a symbol interval, each of said single tone signals having a frequency equal to an even multiple of the inverse of said symbol interval;

retrieving said distinct single tone signals prior to demodulating said multicarrier modulated signal;

estimating the frequency offset and timing mismatch of the sampler, and wherein said frequency offset and timing mismatch estimation step further comprises:

dividing each of said distinct single tone signals into a first and second sample vector, for a total of four sample vectors, each of said first sample vectors comprising a first part of said samples of said single tone signal, respectively, and each of said second sample vectors comprising a second part of said samples of said single tone signal, respectively;

computing a first inverse tangent of the ratio of an imaginary part to a real part of the product of the transform of said second sample vector of said first single tone signal and said first sample vector of said first sample vector of said first single tone signal, computing a second inverse tangent of the ratio of an imaginary part to a real part of the product of the transform of said second sample vector of said single tone signal and said first sample vector of said second single tone signal;

computing said estimated frequency offset as the ratio of the difference between the product of said first inverse tangent and said second multiple and the product of said second inverse tangent to said multiple, to the sum of the product of n and the difference between said first and second multiples and the difference between said first and second inverse tangents; and computing said estimated timing mismatch as the ratio of the difference between said first and second inverse tangents, to the product of n and the difference between said first and second multiples;

adjusting said sampling step according to said estimated timing mismatch;

adjusting said received multicarrier modulated signal according to said estimated frequency offset; and demodulating said received multicarrier modulated signal.

14. A method according to claim 13 wherein said demodulating involves a Fourier transform operation of said multicarrier modulated signal.

15. A method according to claim 13 wherein said first part of samples and said second part of samples, for each of said single tone signals comprise disjoint sets of samples.

16. A method according to claim 15 wherein said first and second parts of samples of said first single tone signal consists essentially of samples from said symbol interval of said first single tone signal and said first and second parts of samples of said second single tone signal consists essentially of samples from said symbol interval of said second single tone signal.

17. A method according to claim 16 wherein said first and second parts of samples for each of said single tone signals comprise an equal number of samples.

18. A method according to claim 17 wherein said first part of samples of each of said single tone signals consists of said samples received over a first half of said symbol interval and said second part of samples of each of said single tone signals consists of said samples received over a second half of said symbol interval.

* * * * *